US006948929B2

(12) United States Patent
Komai et al.

(10) Patent No.: US 6,948,929 B2
(45) Date of Patent: Sep. 27, 2005

(54) COMBUSTION TYPE WASTE GAS TREATMENT SYSTEM

(75) Inventors: Tetsuo Komai, Kanagawa (JP); Kohtaro Kawamura, Tokyo (JP); Takeshi Tsuji, Kanagawa (JP); Rikiya Nakamura, Kanagawa (JP); Kazutaka Okuda, Kanagawa (JP); Keiichi Ishikawa, Kanagawa (JP); Tomonori Ohashi, Kanagawa (JP); Yoshiro Takemura, Kanagawa (JP); Yasutaka Muroga, Tokyo (JP); Tadakazu Nishikawa, Kanagawa (JP); Yuji Shirao, Kanagawa (JP)

(73) Assignee: Ebara Corporation, Tokyo (JP)

( * ) Notice: Subject to any disclaimer, the term of this patent is extended or adjusted under 35 U.S.C. 154(b) by 632 days.

(21) Appl. No.: 09/962,117

(22) Filed: Sep. 26, 2001

(65) Prior Publication Data

US 2002/0041836 A1 Apr. 11, 2002

(30) Foreign Application Priority Data

Oct. 2, 2000 (JP) .................................... 2000-302410
Oct. 2, 2000 (JP) .................................... 2000-302411

(51) Int. Cl.[7] ............................................ F23D 14/62

(52) U.S. Cl. ........................ 431/354; 431/77; 431/22; 431/29; 239/428; 239/413

(58) Field of Search ............................ 431/353, 354, 431/202, 5, 12, 75, 77, 19, 16, 22, 29, 174, 181; 239/422, 428, 424, 413

(56) References Cited

U.S. PATENT DOCUMENTS

| | | | | |
|---|---|---|---|---|
| 2,745,476 A | | 5/1956 | Teti | 239/427 |
| 3,985,494 A | | 10/1976 | Childree | 431/202 |
| 4,144,313 A | | 3/1979 | Germerdonk et al. | 431/5 |
| 4,229,157 A | * | 10/1980 | Ito et al. | 431/5 |
| 4,678,120 A | | 7/1987 | Matsuo | 431/22 |
| 4,861,262 A | * | 8/1989 | Gitman et al. | 431/75 |
| 4,913,069 A | * | 4/1990 | Schultz et al. | 110/346 |
| 5,307,620 A | * | 5/1994 | Hamahira et al. | 431/22 |
| 5,310,334 A | | 5/1994 | Spiros | 431/5 |
| 5,603,905 A | * | 2/1997 | Bartz et al. | 431/7 |
| 5,766,000 A | | 6/1998 | Thompson | 431/9 |
| 5,827,950 A | | 10/1998 | Woodbury et al. | 431/22 |

FOREIGN PATENT DOCUMENTS

| | | |
|---|---|---|
| DE | 1 629 867 | 3/1971 |
| DE | 28 57 224 | 4/1980 |

(Continued)

OTHER PUBLICATIONS

Patent Abstracts of Japan, entitled "*Leakage Detection Mechanism of Dual Cut–Off Valve in Gas Combustion Apparatus*", vol. 013, No. 223 (M–829), May 24, 1989 & JP 01 038514 A (Tokyo Gas Co. LdD.) Feb. 8, 1989.

*Primary Examiner*—Josiah C. Cocks
(74) *Attorney, Agent, or Firm*—Wenderoth, Lind & Ponack, L.L.P.

(57) ABSTRACT

A combustion type waste gas treatment system is capable of oxidatively decomposing a hazardous combustible waste gas while heating efficiently with a structure which allows the waste gas to mix with an auxiliary burning gas efficiently without the occurrence of backfire in a waste gas inlet pipe. The combustion type waste gas treatment system has a burner part and a combustion chamber. Combustion flames are formed to extend from the burner part toward the combustion chamber, and a combustible waste gas is introduced into the combustion flames from waste gas inlet pipes thereby oxidatively decomposing the waste gas. A flow velocity accelerating device makes the flow velocity of the combustible waste gas flowing through the waste gas inlet pipe higher than the burning velocity of the combustible waste gas.

3 Claims, 15 Drawing Sheets

FOREIGN PATENT DOCUMENTS

| | | | |
|---|---|---|---|
| EP | 0 205 841 | 12/1986 | |
| EP | 0 978 491 | 2/2000 | |
| GB | 2 023 267 | 12/1979 | |
| GB | 2 304 180 | 3/1997 | |
| WO | WO 98/06977 A1 * | 2/1998 | ............. F23G/7/06 |
| WO | 00/32990 | 6/2000 | |
| WO | 01/33141 | 5/2001 | |

* cited by examiner

COMBUSTION TYPE WASTE GAS TREATMENT SYSTEM

BACKGROUND OF THE INVENTION

The present invention relates to a combustion type waste gas treatment system for combustion-treating hazardous and combustible waste gases discharged from semiconductor manufacturing systems, liquid crystal panel manufacturing systems, etc. More specifically, the present invention relates to a combustion type waste gas treatment system for combustion-treating hazardous and combustible waste gases containing, for example, silane gas ($SiH_4$) or a halogen-containing gas ($NF_3$, $CF_3$, $SF_6$, $CHF_3$, $C_2F_6$, $CF_4$, etc.), or hardly decomposable waste gases.

A conventional combustion type waste gas treatment system has a burner part and a combustion chamber provided at the downstream side of the burner part. An auxiliary burning gas is supplied into the burner part and burned to form flames, and a hazardous and combustible waste gas introduced into the burner part is burned with the flames. Regarding the auxiliary burning gas, hydrogen gas, city gas, propane gas or the like is used as fuel gas, and oxygen or air is usually used as an oxidizing agent.

To oxidatively decompose a hazardous and combustible waste gas efficiently under heating in such a combustion type waste gas treatment system, it is desirable that the treatment system have a structure which allows the waste gas flowing into the burner part and the combustion chamber to mix thoroughly with other combustion gas and permits the waste gas to stay in the combustion chamber for a lengthened period of time and which facilitates heating of the waste gas. Conventional waste gas treatment systems of the type described above are not satisfactory in terms of the resident time of waste gas and the scheme of heating waste gas.

In the above-described combustion type waste gas treatment system, because the waste gas is combustible, there is a danger of backfire spreading into a waste gas inlet pipe for introducing the combustible waste gas into the burner part, which may cause devices to be broken. There is also a danger of pressure rise due to abnormal combustion, which may also cause breakage of devices. Further, there is a danger that fuel gas or oxygen gas may leak from the fuel gas supply line or the oxygen gas supply line. When hydrogen gas is used as fuel gas in particular, leakage of hydrogen gas and oxygen gas may cause an explosion. Therefore, there is a demand for implementation of a combustion type waste gas treatment system capable of coping with these dangers and stabilizing the combustion of the auxiliary burning gas and hence capable of combustion-treating waste gas safely and efficiently.

SUMMARY OF THE INVENTION

The present invention was made in view of the above-described circumstances.

An object of the present invention is to provide a combustion type waste gas treatment system capable of oxidatively decomposing a hazardous combustible waste gas by heating efficiently with a structure which allows the waste gas to mix with the auxiliary burning gas efficiently without the occurrence of backfire in the waste gas inlet pipe and permits the waste gas to stay in the combustion chamber for a lengthened period of time and which facilitates heating of the waste gas.

Another object of the present invention is to provide a combustion type waste gas treatment system capable of preventing breakage which would otherwise be caused by backfire spreading into the fuel gas piping or by a pressure rise resulting from abnormal combustion at the time of ignition or extinction of flames in particular and making it possible to check leakage of oxygen gas and fuel gas easily and to obtain stable combustion of the auxiliary burning gas, thereby allowing waste gas to be treated by combustion safely and efficiently.

The present invention provides a combustion type waste gas treatment system having a burner part and a combustion chamber provided at the downstream side of the burner part. Combustion flames are formed to extend from the burner part toward the combustion chamber, and a combustible waste gas is introduced into the combustion flames from a waste gas inlet pipe opening on the inner wall surface of the burner part, thereby oxidatively decomposing the waste gas. A flow velocity accelerating device is provided in the waste gas inlet pipe to make the flow velocity of the combustible waste gas flowing through the waste gas inlet pipe higher than the burning velocity of the combustible waste gas.

The provision of a flow velocity accelerating device that makes the flow velocity of the combustible waste gas flowing through the waste gas inlet pipe higher than the burning velocity of the combustible waste gas prevents backfire from spreading into the waste gas inlet pipe.

Preferably, the flow velocity accelerating device is a narrowed pipe portion with a reduced pipe diameter or an orifice provided in a predetermined portion of the waste gas inlet pipe. The narrowed pipe portion or the orifice has an inner diameter set so that the flow velocity of the combustible waste gas passing through the narrowed pipe portion or the orifice will be higher than the burning velocity of the combustible waste gas.

Preferably, the flow velocity accelerating device is provided in a coupling mechanism for coupling together a flange at an inlet of the waste gas inlet pipe and a flange at an end of a waste gas supply pipe for supplying the waste gas to the inlet. The coupling mechanism includes a plate-shaped member having an orifice opening formed in the center thereof and a clamp member for fastening together the outer peripheral edges of the two flanges in a state where the plate-shaped member is interposed between the two flanges. The orifice opening has an inner diameter set so that the flow velocity of the combustible waste gas passing through the orifice opening will be higher than the burning velocity of the combustible waste gas.

As stated above, the flow velocity accelerating device is provided in a coupling mechanism for coupling together a flange at an inlet of the waste gas inlet pipe and a flange at an end of a waste gas supply pipe, and a plate-shaped member with an orifice opening formed in the center thereof is interposed between the two flanges. Accordingly, it is possible to prevent backfire from spreading into the waste gas inlet pipe without changing the structure of the existing combustion type waste gas treatment system.

Preferably, the combustion flames form swirling flows in the burner part, and the swirling flows include free vortices distributed in an area closer to the outer peripheral side and forced vortices distributed in an area closer to the inner peripheral side. The radial position of an opening of the waste gas inlet pipe that opens on the inner wall surface of the burner part is set in the area where the free vortices are distributed.

With the above-described arrangement, in which the radial position of an opening of the waste gas inlet pipe that opens on the inner wall surface of the burner part is set in the free vortex area, the waste gas flowing into the burner part is thoroughly mixed with the combustion gas of the auxiliary burning gas. This promotes thermal oxidative decomposition of the waste gas.

In addition, the present invention provides a combustion type waste gas treatment system having a burner part and a combustion chamber provided at the downstream side of the burner part. Combustion flames are formed to extend from the burner part toward the combustion chamber, and a combustible waste gas is introduced into the combustion frames from a waste gas inlet pipe opening on the inner wall surface of the burner part, thereby oxidatively decomposing the waste gas. The waste gas inlet pipe is installed on the burner part so that the waste gas blown off from an opening of the waste gas inlet pipe that opens on the inner wall surface of the burner part forms a swirling flow directed obliquely downward in the burner part and the combustion chamber.

Thus, the waste gas inlet pipe is arranged so that the waste gas blown off from the opening of the waste gas inlet pipe that opens on the inner wall surface of the burner part forms a swirling flow directed obliquely downward in the burner part and the combustion chamber. Therefore, the length of time (resident time) that the waste gas stays in the combustion chamber increases. Consequently, heating of the waste gas is facilitated, and mixing of the waste gas with other combustion gas is promoted. Accordingly, thermal oxidative decomposition of the waste gas can be carried out efficiently.

In addition, the present invention provides a combustion type waste gas treatment system having a burner part and a combustion chamber provided at the downstream side of the burner part. Combustion flames are formed to extend from the burner part toward the combustion chamber, and a waste gas is introduced into the combustion frames to oxidatively decompose the waste gas. A mixer provided outside the burner part is supplied with oxygen gas from an oxygen gas supply line and a fuel gas from a fuel gas supply line to mix together the two gases, thereby forming a mixed gas. The mixed gas is supplied to the burner part and burned therein to form combustion flames.

As stated above, a mixer is provided outside the burner part and supplied with oxygen gas from an oxygen gas supply line and a fuel gas from a fuel gas supply line to mix together the two gases, and the mixed gas is supplied to the burner part. Therefore, it is easy to control the mixture ratio of the oxygen gas and the fuel gas in the mixer. Accordingly, it becomes possible to realize efficient combustion treatment of waste gas and easy to prevent the occurrence of abnormal ignition and backfire at the time of ignition and extinction of flames.

Preferably, a plurality of devices inserted and connected to each of the oxygen gas supply line and the fuel gas supply line are arranged so that those which have relatively low pressure resistance are disposed on the upstream side and those which exhibit high pressure resistance or give rise to no problem even if broken are disposed on the downstream side.

As stated above, a plurality of devices inserted and connected to each of the oxygen gas supply line and the fuel gas supply line so that those which have relatively low pressure resistance are disposed on the upstream side and those which exhibit high pressure resistance or give rise to no problem even if broken are disposed on the downstream side. Therefore, it is possible to protect the oxygen gas supply line avid the fuel gas supply line when the pressure rises due to abnormal combustion or the like on the downstream side, where combustion or other similar phenomenon is taking place.

Preferably, a first stop valve and a first check valve are provided in the downstream-most stage of each of the oxygen gas supply line and the fuel gas supply line in order from the downstream side thereof. A second check valve and a second stop valve are provided in the upstream-most stage of each of the oxygen gas supply line and the fuel gas supply line in order from the downstream side. In addition, a branch valve for injecting a gas for leak check is provided between the first stop valve and the second stop valve of each of the oxygen gas supply line and the fuel gas supply line.

By providing check valves in both the oxygen gas supply line and the fuel gas supply line as stated above, it is possible to prevent the fuel gas from flowing back to the oxygen gas supply line from the fuel gas supply line and also prevent to oxygen gas from flowing back to the fuel gas supply line from the oxygen gas supply line when there is a pressure rise on the downstream side. Accordingly, it is possible to prevent backfire from spreading into these supply lines. Further, the provision of a branch valve for injecting a gas for leak check between the first stop valve and the second stop valve allows leak check to be performed extremely easily. The ease of carrying out leak check is particularly effective in a case where hydrogen gas, which is likely to leak, is used as fuel gas.

Preferably, a fuel gas chamber is provided around the outer periphery of the burner part and supplied with the mixed gas from the mixer. The mixed gas is injected into the burner part from the fuel gas chamber through a nozzle. A temperature sensor for detecting the temperature in the fuel gas chamber and a flame extinguishing device are provided. When the temperature in the fuel gas chamber reaches a predetermined temperature below the spontaneous ignition point of the mixed gas, the flames in the burner part are automatically extinguished.

As stated above, a temperature sensor for detecting the temperature in the fuel gas chamber is provided, and when the temperature in the fuel gas chamber reaches a predetermined temperature below the spontaneous ignition point of the mixed gas, the flames in the burner part are automatically extinguished. Accordingly, no backfire will occur.

Preferably, an oxygen gas supply valve is provided in the oxygen gas supply line, and a fuel gas supply valve is provided in the fuel gas supply line. In addition, a non-combustible gas supply line for supplying a non-combustible gas is provided, together with a device for injecting the non-combustible gas from the non-combustible gas supply line to the downstream sides of the oxygen gas supply valve and the fuel gas supply valve. At the time of extinguishing the flames, the oxygen gas supply valve and the fuel gas supply valve are closed, and the oxygen gas supply line and the fuel gas supply line are supplied with the non-combustible gas as a purge gas in an amount equal to the amount of oxygen gas and fuel gas which would otherwise be supplied.

As stated above, at the time of extinguishing the flames, the oxygen gas supply valve and the fuel gas supply valve are closed to stop the supply of the oxygen gas and the fuel gas. Thereafter, the oxygen gas supply line and the fuel gas supply line are supplied with the non-combustible gas as a purge gas in an amount equal to the amount of oxygen gas and fuel gas which would otherwise be supplied. Consequently, it is possible to eliminate variations in the flow rate. Thus, it becomes possible to prevent the occurrence of backfire at the time of extinction of flames.

The foregoing and other objects, features and advantages of the present invention will be apparent from the following detailed description and appended claims taken in connection with the accompanying drawings.

DETAILED DESCRIPTION OF THE INVENTION

Embodiments of the present invention will be described below in detail with reference to the accompanying drawings.

Figure 1:
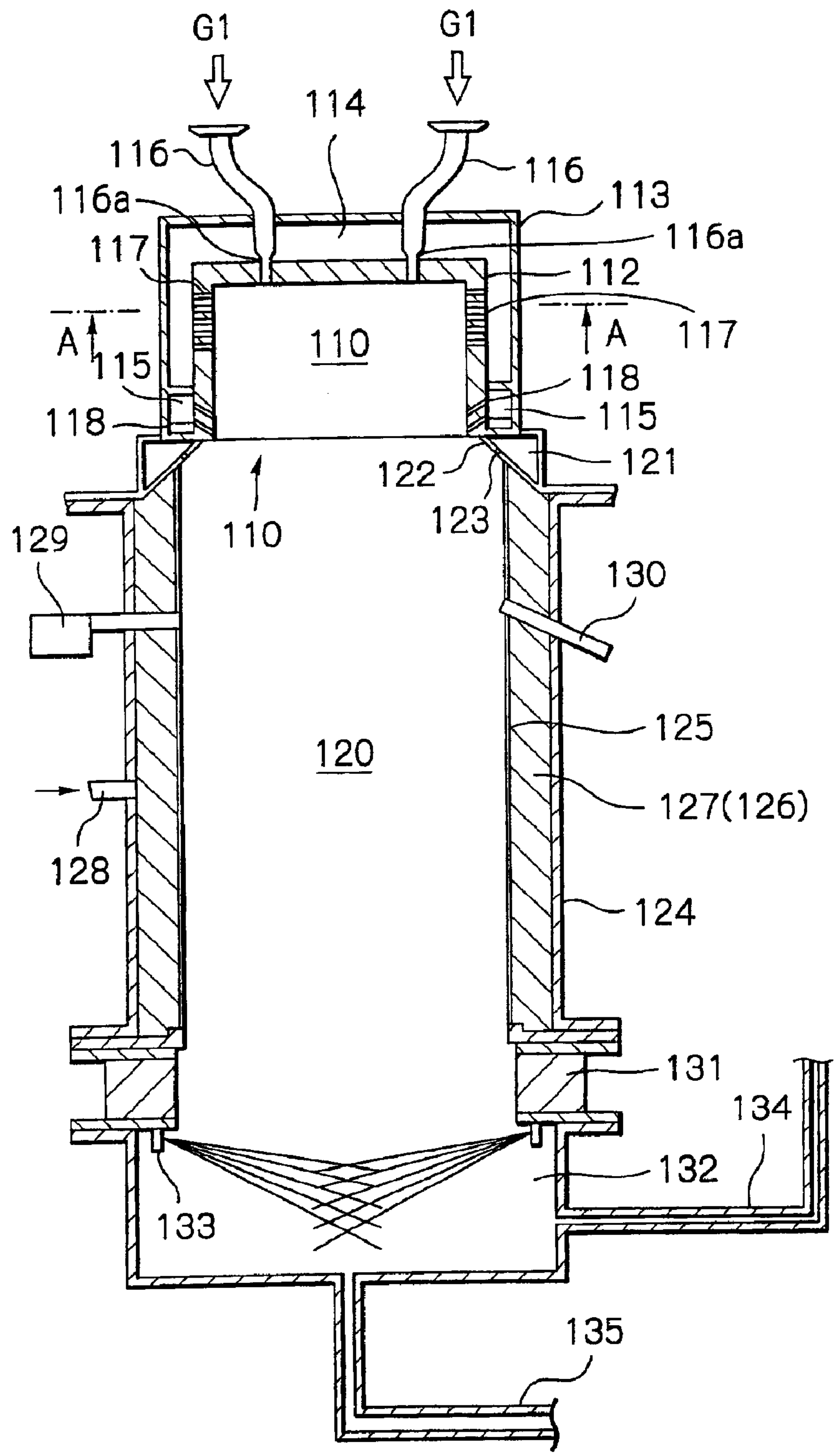
FIG. 1 is a vertical sectional view showing the arrangement of a first embodiment of the combustion type waste gas treatment system according to the present invention.
Figure 2:
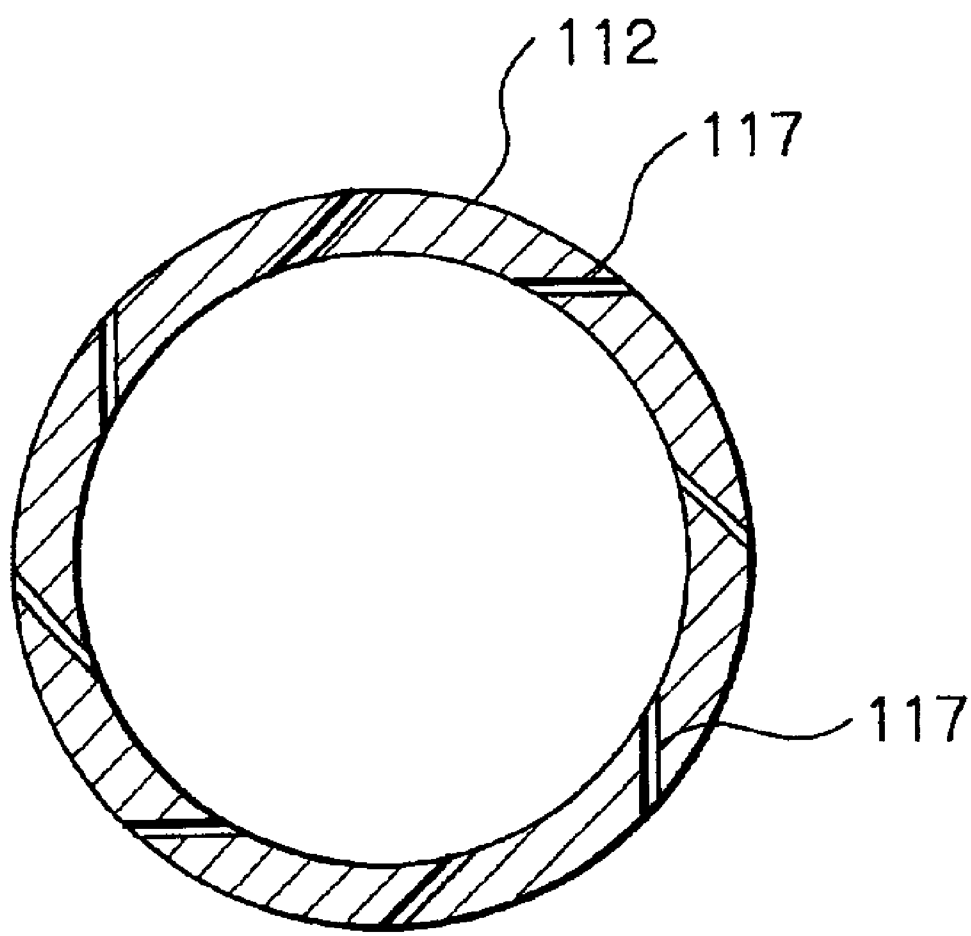
FIG. 2 is a sectional view taken along the line A—A in FIG. 1.

FIGS. 1 and 2 are diagrams showing the arrangement of a first embodiment of the combustion type waste gas treatment system according to the present invention. FIG. 1 is a vertical sectional view, and FIG. 2 is a sectional view taken along the line A—A in FIG. 1. The waste gas treatment system is formed in the shape of a cylindrical closed vessel as a whole. The waste gas treatment system has a burner part 110 in an upper stage and a combustion chamber (combustion reaction part) 120 in an intermediate stage. The waste gas treatment system further has a cooling part 131 and a discharge part 132 in a lower stage. As a cooling medium in the cooling part 131, for example, a liquid, e.g. water, or a gas, e.g. air, is used.

The burner part 110 has a cylindrical member 112 forming a flame stabilizing portion 111 opening toward the combustion chamber 120. The burner part 110 further has an outer cylinder 113 surrounding the cylindrical member 112 with a predetermined space therebetween. Between the cylindrical member 112 and the outer cylinder 113, an air chamber 114 for holding air for combustion is formed, together with an auxiliary burning gas chamber 115 for holding an auxiliary burning gas, e.g. a mixed gas of hydrogen and oxygen. The air chamber 114 and the auxiliary burning gas chamber 115 communicate with an air source (not shown) and a gas source (not shown), respectively. As the auxiliary burning gas, propane gas, city gas, etc. may be used in addition to a mixed gas of hydrogen and oxygen.

Waste gas inlet pipes 116 are connected to the top of the cylindrical member 112 covering the upper side of the flame stabilizing portion 111 to introduce a hazardous combustible waste gas G1 discharged from a semiconductor manufacturing system, a liquid crystal panel manufacturing system, etc. The waste gas inlet pipes 116 are each provided at the distal end thereof with a narrowed pipe portion 116*a* with a reduced bore to increase the flow velocity of waste gas G1 flowing therethrough, as detailed later. The cylindrical member 112 is provided with a plurality of air nozzles 117 for providing communication between the air chamber 114 and the flame stabilizing portion 111 and a plurality of auxiliary burning gas nozzles 118 for providing communication between the auxiliary burning gas chamber 115 and the flame stabilizing portion 111.

As shown in FIG. 2, the air nozzles 117 extend at a predetermined angle to the tangential direction with respect to the cylindrical member 112 to blow off air so as to produce swirling flows in the flame stabilizing portion 111. Similarly, the auxiliary burning gas nozzles 118 extend at a predetermined angle to the tangential direction with respect to the cylindrical member 112 to blow off an auxiliary burning gas so as to form swirling flows in the flame stabilizing portion 111. The air nozzles 117 and the auxiliary burning gas nozzles 118 are disposed equally in the circumferential direction of the cylindrical member 112.

A secondary air chamber 121 is formed around the boundary between the flame stabilizing portion 111 and the combustion chamber 120 so as to surround the opening of the flame stabilizing portion 111. The secondary air chamber 121 communicates with an air source (not shown) for supplying secondary air. A partition plate 122 dividing the secondary air chamber 121 from the combustion chamber 120 is provided with secondary air nozzles 123 equally disposed in the circumferential direction to blow off secondary air into the combustion chamber 120 to oxidize waste gas.

The combustion chamber 120 is a space for oxidatively decomposing waste gas at a stage subsequent to the burner part 110. The combustion chamber 120 is defined by a cylindrical inner wall 125 provided inside a hermetic cylindrical outer vessel 124 made of a metal or the like. The inner wall 125 is disposed to be contiguous with the flame stabilizing portion 111. The inner wall 125 is formed from a fiber-reinforced ceramic material, for example. A thermal insulator 127 of a porous ceramic material is inserted into a space 126 between the inner wall 125 and the outer vessel 124. A purge air inlet pipe 128 is connected to the outer vessel 124 to introduce air for purging into the space 126.

The combustion chamber 120 is provided with a UV sensor 129 for detecting flames and a pilot burner 130 for ignition of the gas in the burner part 110. A discharge part 132 is provided at the bottom of the combustion chamber 120 with a cooling part 131 interposed between the combustion chamber 120 and the discharge part 132. A plurality of nozzles 133 are provided on the lower edge of the cooling part 131 at equal spaces in the circumferential direction. Water is injected from the nozzles 133 toward the center of the discharge part 132 to form a curtain of water, thereby cooling the waste gas and capturing particles contained in the waste gas. The side wall of the discharge part 132 is provided with an exhaust pipe 134 for discharging the treated waste gas. The bottom of the discharge part 132 is provided with a drain port 135 for discharging water injected from the nozzles 133.

In the combustion type waste gas treatment system with the above-described structure, the auxiliary burning gas in the auxiliary burning gas chamber 115 is blown off through the auxiliary burning gas nozzles 118 toward the flame stabilizing portion 111 so as to produce swirling flows. When ignited with the pilot burner 130, the auxiliary burning gas forms combustion flames swirling in the cylindrical member (inner cylinder) 112. Meanwhile, the waste gas G1 to be treated is blown off toward the flame stabilizing portion 111 from the waste gas inlet pipes 116, which open on the inner wall surface of the top of the cylindrical member 112. The waste gas G1 is blown into the flame stabilizing portion 111 after the flow velocity thereof has been increased through the narrowed pipe portions 116*a* formed at the distal ends of the waste gas inlet pipes 116.

Figure 3:
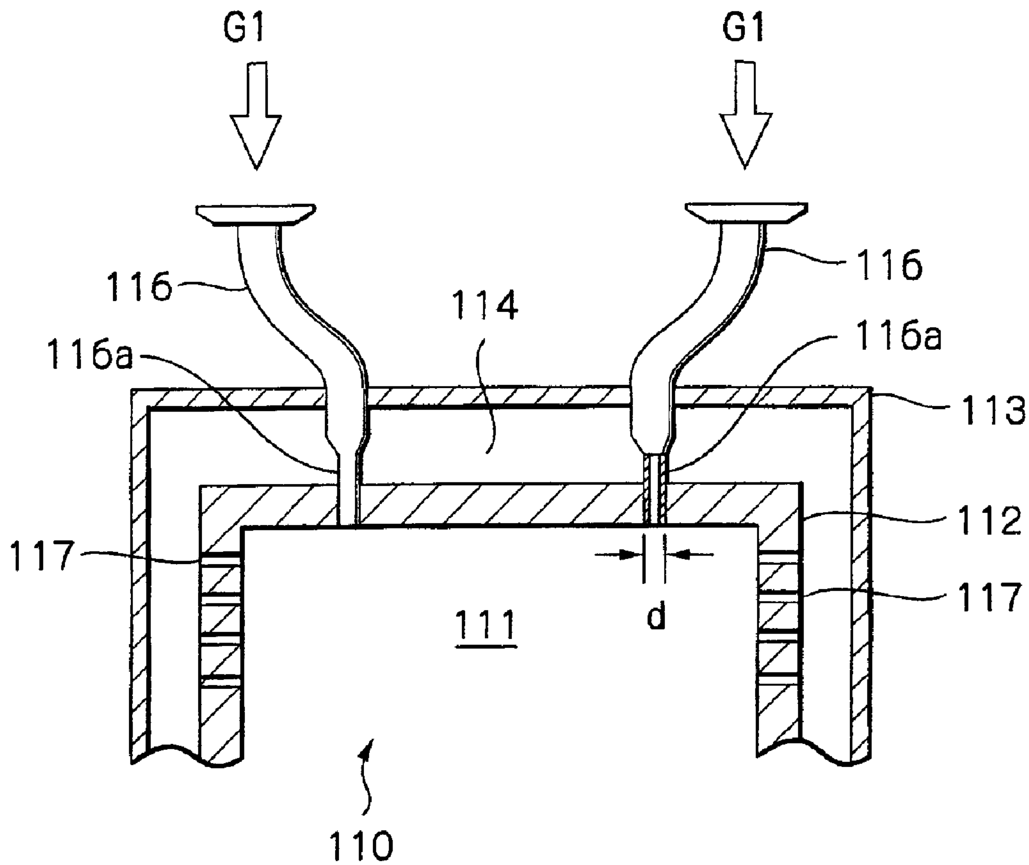
FIG. 3 is a sectional view showing a structural example of a burner part in the combustion type waste gas treatment system according to the present invention.

FIG. 3 is a diagram showing the details of the burner part 110. The reason why the narrowed pipe portions 116*a* are formed at the distal ends of the waste gas inlet pipes 116 to increase the flow velocity of the waste gas G1 is to prevent backfire from spreading into the waste gas inlet pipes 116. Accordingly, the inner diameter d of each narrowed pipe portion 116*a* is set so that the flow velocity of the waste gas G1 flowing through the narrowed pipe portion 116*a* will be higher than the burning velocity of the waste gas G1. More specifically, assuming that hydrogen ($H_2$) gas, which exhibits the highest burning velocity among gases under the same conditions, flows into the flame stabilizing portion 111, the inner diameter d of the narrowed pipe portion 116*a* is set so that the flow velocity will be higher than the burning velocity of hydrogen gas in the air, i.e. 2.5 to 2.8 m/s.

The inner diameter d of the narrowed pipe portion 116*a* of each waste gas inlet pipe 116 is determined by the flow rate at which the flow velocity of the waste gas G1 is the lowest, that is, the minimum inlet flow rate of waste gas. For example, if the minimum inlet flow rate is 20 l/min, the inner diameter d is approximately 12.3 mm or less. If 40 l/min, $d \approx 17.4$ mm or less. However, if the inner diameter d of the narrowed pipe portion 116*a* is reduced more than is needed, the pressure loss in the waste gas inlet pipes 116 increases unfavorably. Therefore, the inner diameter and length of each narrowed pipe portion 116*a* should be set so that the pressure loss in the waste gas inlet pipes 116 will be less than an allowable value (differing according to circumstances).

Figure 4:
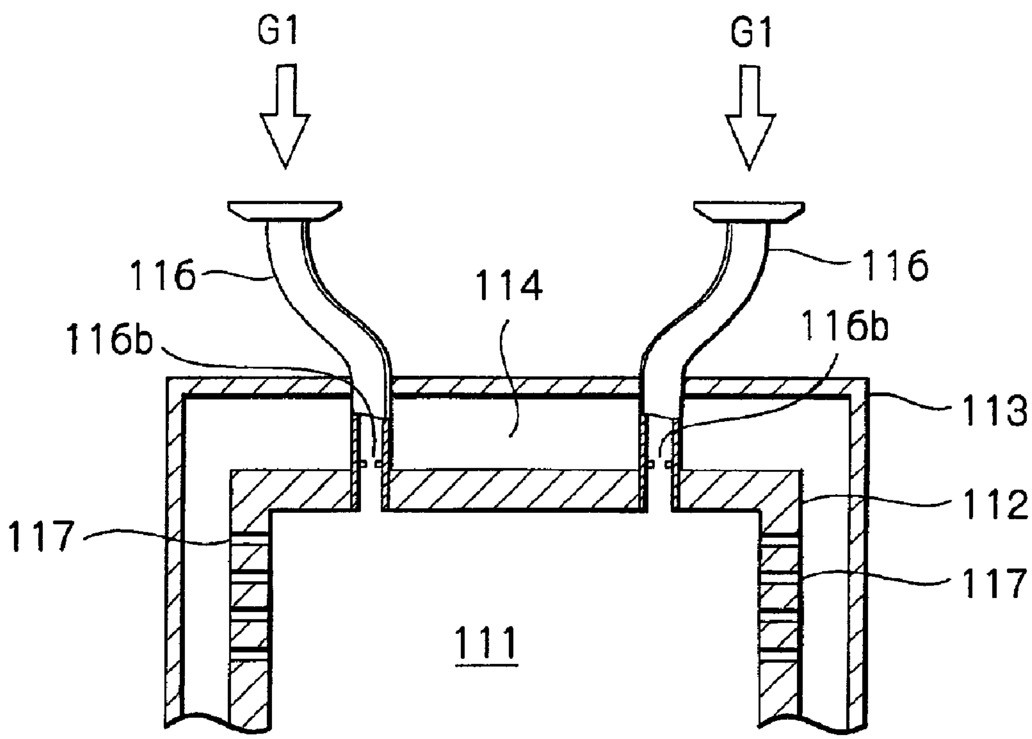
FIG. 4 is a sectional view showing another structural example of the burner part in the combustion type waste gas treatment system according to the present invention.

To prevent backfire from spreading into the waste gas inlet pipes 116, orifices 116*b* may be provided in the waste gas inlet pipes 116 as shown in FIG. 4 so that the flow velocity of the waste gas G1 passing through the orifices 116*b* will be higher than the burning velocity of the waste gas G1, instead of providing the narrowed pipe portions 116*a* as stated above. The method of setting the inner diameter of the orifices 116*b* is the same as the above.

The narrowed pipe portion 116*a* or the orifice 116*b* is provided at one position in each waste gas inlet pipe 116. It should be noted, however, that in order to reduce the spread of backfire in the waste gas inlet pipes 116 when it occurs, the narrowed pipe portion 116*a* or the orifice 116*b* should preferably be provided immediately in front of the flame stabilizing portion 111, that is, immediately upstream of the opening of each waste gas inlet pipe 116 that opens on the inner wall surface of the top of the cylindrical member 112.

Figure 5:
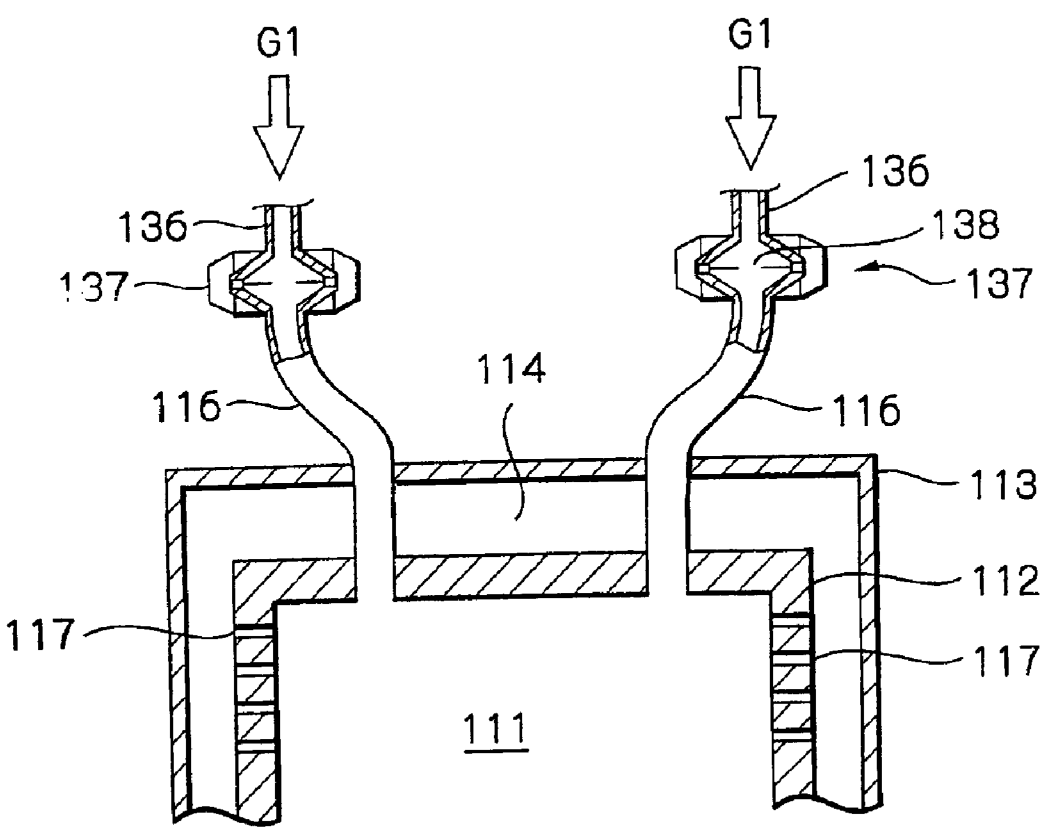
FIG. 5 is a sectional view showing still another structural example of the burner part in the combustion type waste gas treatment system according to the present invention.
Figure 6:
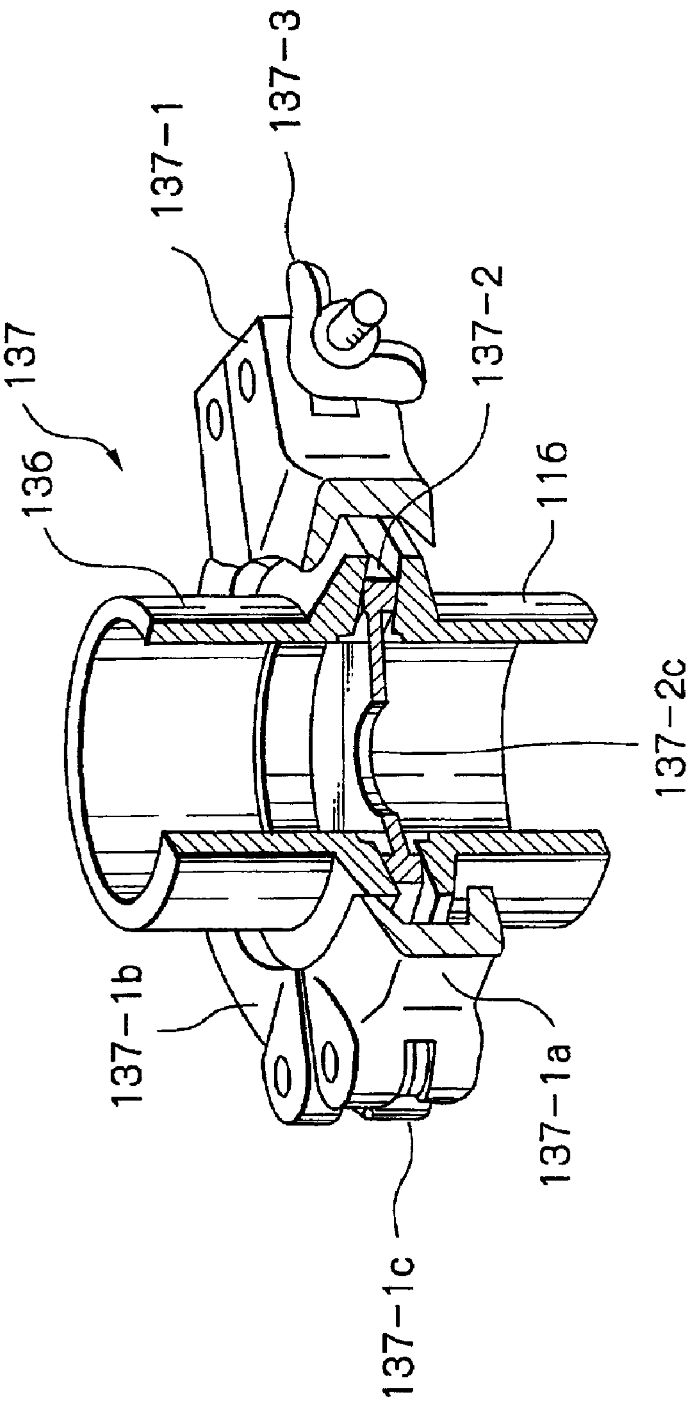
FIG. 6 is a partly-cutaway perspective view showing the arrangement of a coupling mechanism for coupling together a waste gas inlet pipe and a waste gas supply line in the combustion type waste gas treatment system according to the present invention.
Figure 7:
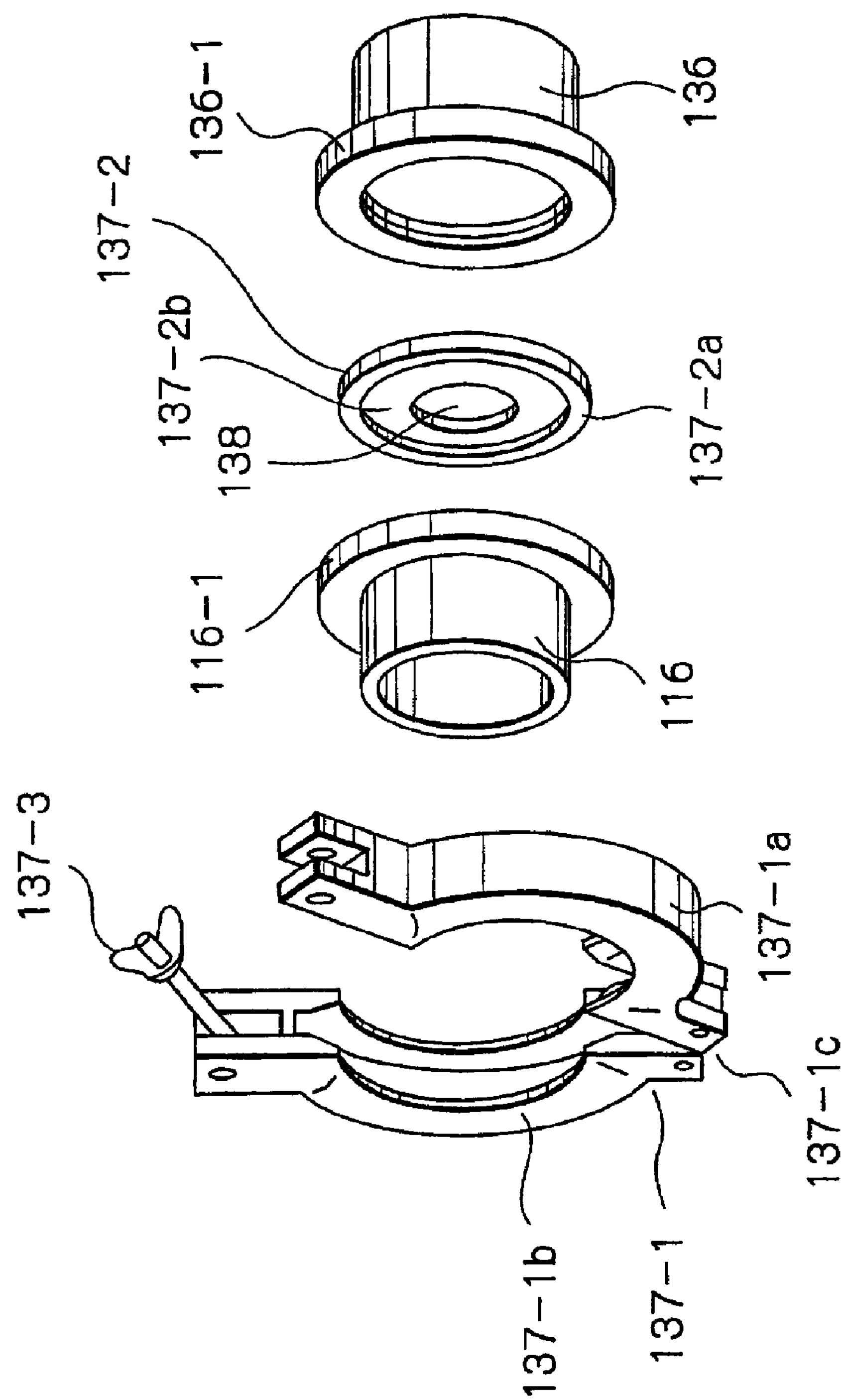
FIG. 7 is an exploded perspective view of the coupling mechanism shown in FIG. 6.

The position where each orifice 116*b* is provided is not necessarily limited to the inside of the associated waste gas inlet pipe 116. As shown in FIG. 5, an orifice opening 138 may be provided in a coupling mechanism 137 for coupling together each waste gas inlet pipe 116 and a waste gas supply pipe 136 for supplying waste gas to the waste gas inlet pipe 116. FIGS. 6 and 7 are diagrams showing the detailed structure of the coupling mechanism 137. FIG. 6 shows the coupling mechanism 137 in an assembled state. FIG. 7 is an exploded perspective view showing the components of the coupling mechanism 137.

The coupling mechanism 137 has a clamp member 137-1 for fastening together the outer peripheral edge of an inlet flange 116-1 of a waste gas inlet pipe 116 and the outer peripheral edge of an end flange 136-1 of a waste gas supply pipe 136. The coupling mechanism 137 further has a circular plate-shaped member 137-2. The clamp member 137-1 has two arcuate clamping members 137-1*a* and 137-1*b* that are pivotally connected together at one end thereof by a hinge mechanism 137-1*c*. The two clamping members 137-1*a* and 137-1*b* can be fastened to each other with a bolt and wing nut 137-3. The plate-shaped member 137-2 has an integral structure formed from a ring-shaped member 137-2*a* and a disk-shaped member 137-2*b*. The ring-shaped member 137-2*a* has a diameter that permits it to be interposed between the flanges 116-1 and 136-1. The disk-shaped member 137-2*b* closes the bore of the ring-shaped member 137-2*a*. The plate-shaped member 137-2 has an orifice opening 138 formed in the center thereof.

In the coupling mechanism 137 having the above-described components, the flange 116-1 of the waste gas inlet pipe 116 and the flange 136-1 of the waste gas supply pipe 136 are disposed to abut against each other with the plate-shaped member 137-2 interposed therebetween. In this state, the outer peripheral edges of the flanges 116-1 and 136-1 are fastened to each other with the clamp member 137-1. Consequently, the flanges 116-1 and 136-1 are coupled together in an airtight manner through the ring-shaped member 137-2*a* of the plate-shaped member 137-2. At the same time, the waste gas inlet pipe 116 and the waste gas supply pipe 136 are allowed to communicate with each other through the orifice opening 138. Accordingly, it is possible to prevent backfire from spreading into the waste gas supply pipe 136 by setting the inner diameter of the orifice opening 138 so that the flow velocity of the waste gas G1 passing through the orifice opening 138 will be higher than the burning velocity of the waste gas G1.

In this case also, it is desirable that the length of each waste gas inlet pipe 116 be as short as possible from the viewpoint of reducing the spread of backfire into the waste gas inlet pipe 116 when it occurs. Thus, it becomes possible to readily take measures to prevent backfire from spreading into the waste gas inlet pipe 116 without changing the structure of the existing combustion type waste gas treatment system by providing the orifice opening 138 in the coupling mechanism 137 for coupling together the waste gas inlet pipe 116 and the waste gas supply pipe 136.

Figure 8:
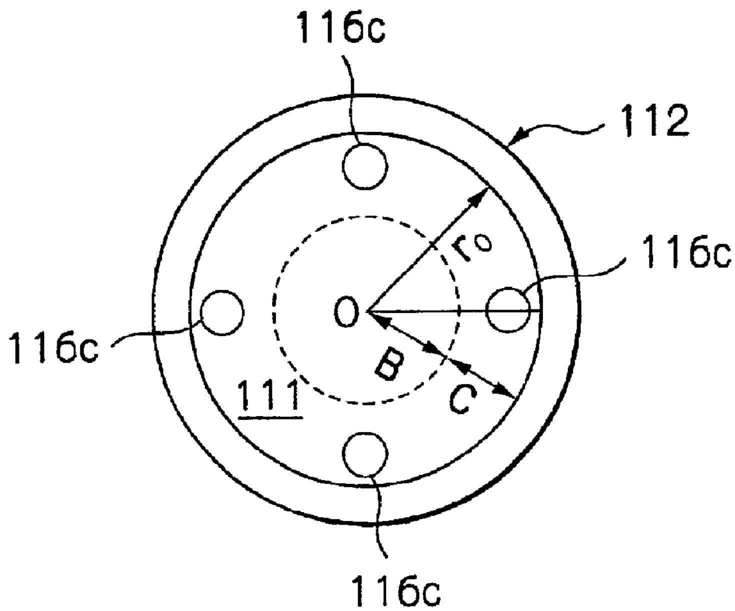
FIG. 8 is a diagram showing the distribution of swirling vortices in a flame stabilizing portion of the burner part of the combustion type waste gas treatment system.
Figure 9:
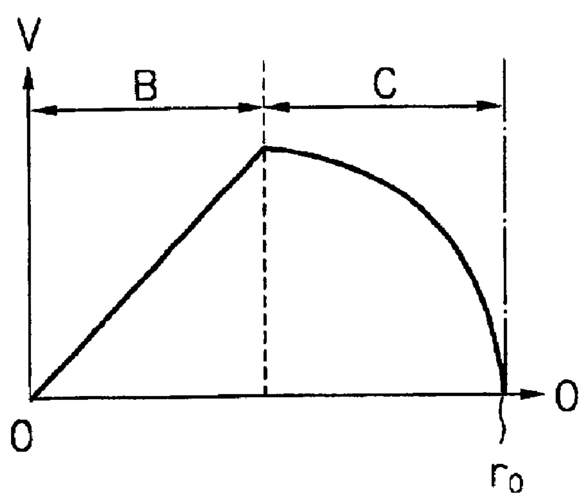
FIG. 9 is a diagram showing the speed and distribution of swirling vortices in the flame stabilizing portion of the burner part of the combustion type waste gas treatment system.

In a case where swirling flows are formed in the flame stabilizing portion 111 of the burner part 110 of the above-described combustion type waste gas treatment system, the distribution of swirling flows is as shown in FIG. 8. That is, an area C of free vortices (vortices whose angular velocity is variable) is located at the outer peripheral side in the flame stabilizing portion 111, and an area B of forced vortices (vortices whose angular velocity is constant) lies at the inner peripheral side of the free vortex area C. The relationship between the flow velocity V of the swirling flows and the radial distance r from the center O of the flame stabilizing portion 111 is as shown in FIG. 9. If the radial position of an opening 116*c* of each waste gas inlet pipe 116 that opens on the inner wall surface of the top of the burner part 110 is set in the free vortex area C as shown in FIG. 8, the waste gas flowing in from the opening 116*c* is mixed with other combustion gas efficiently. That is, because the angular velocity is variable in the free vortex area C, shear force is generated, which promotes mixing of the gases.

Figure 10:
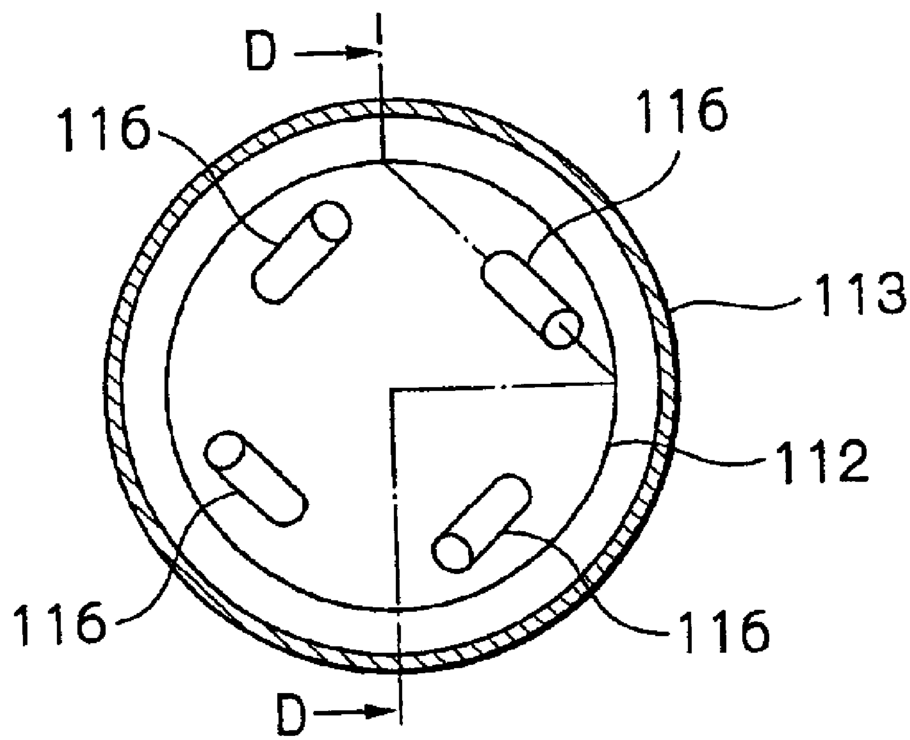
FIG. 10 is a horizontal sectional view (taken along the line E—E in FIG. 11) showing the arrangement of a second embodiment of the combustion type waste gas treatment system according to the present invention.
Figure 11:
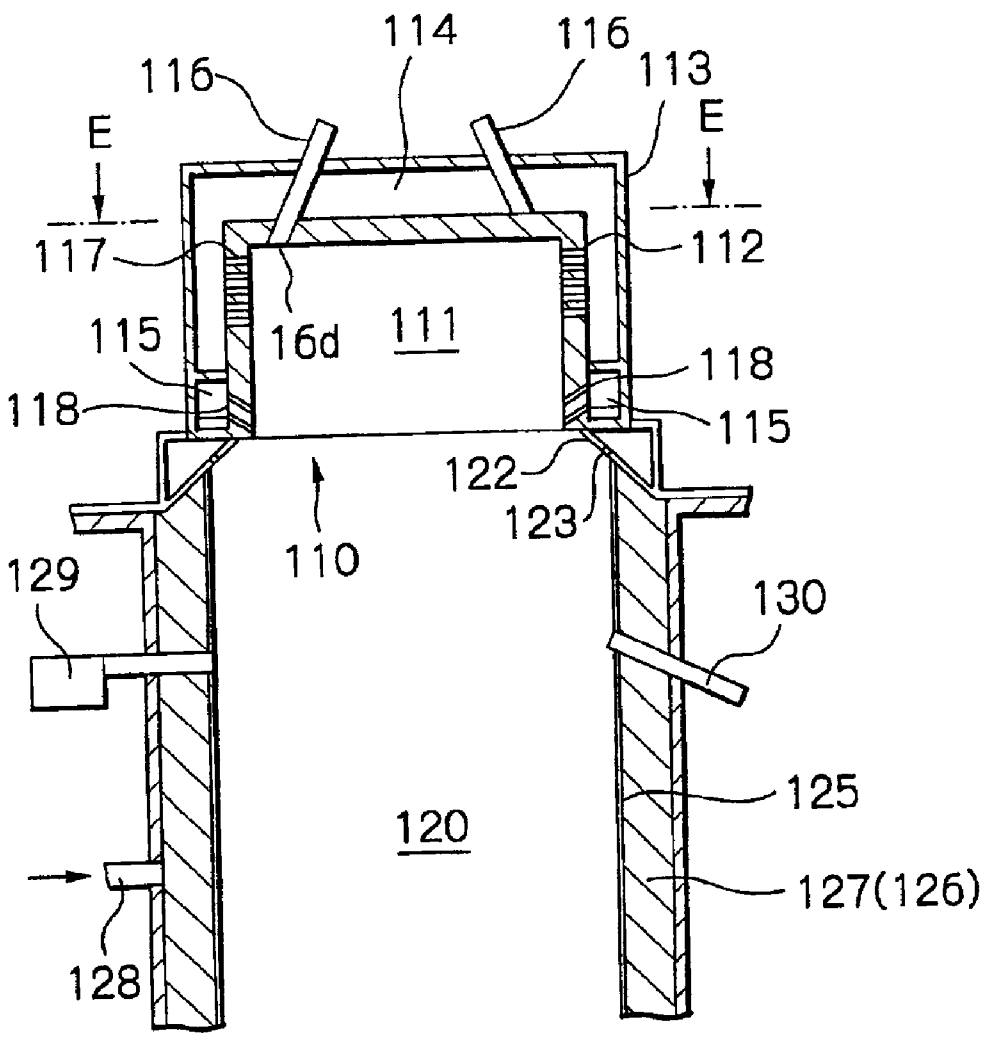
FIG. 11 is a horizontal sectional view (taken along the line D—D in FIG. 10) showing the arrangement of the second embodiment of the combustion type waste gas treatment system according to the present invention.

FIGS. 10 and 11 are diagrams showing the arrangement of a second embodiment of the combustion type waste gas treatment system according to the present invention. FIG. 10 is a sectional view taken along the line E—E in FIG. 11. FIG. 11 is a sectional view taken along the line D—D in FIG. 10. In FIGS. 10 and 11, the same reference numerals as those in FIGS. 1 and 2 denote the same or corresponding portions or members. The combustion type waste gas treatment system according to this embodiment differs from that shown in FIGS. 1 and 2 in that the waste gas inlet pipes 116 are installed on the top of the burner part 110 so that waste gas blown off from openings 116*d* of the waste gas inlet pipes 116 that open on the inner wall surface of the cylindrical member 112 constituting the burner part 110 forms swirling flows directed obliquely downward in the burner part 110 and the combustion chamber 120.

As a result of installing the waste gas inlet pipes 116 so that waste gas blown off from the openings 116*d* on the inner wall surface of the cylindrical member 112 forms obliquely downward swirling flows in the burner part 110 and the combustion chamber 120, the length of time (resident time) that the waste gas stays in the combustion chamber 120 increases. Consequently, heating of the waste gas is facilitated, and mixing of the waste gas with other combustion gas is promoted. Accordingly, thermal oxidative decomposition of the waste gas can be carried out efficiently.

In a waste gas treatment system wherein heat is emitted from the inner wall of the combustion chamber 120 (e.g. an arrangement in which a heater is provided in the inner wall of the combustion chamber 120; an arrangement in which flames are emitted from flame openings provided in the inner wall surface; or an arrangement in which flames are emitted from the whole inner wall surface), thermal oxidative decomposition of hazardous waste gas can be performed particularly effectively because swirling flows of waste gas concentrate in the vicinity of the wall surface of the combustion chamber 120 and thus the waste gas heating effect increases.

It should be noted that the above-described arrangement of the burner part 110 and the combustion chamber 120 is merely an example, and the combustion type waste gas treatment system according to the present invention is not necessarily limited thereto.

Figure 12:
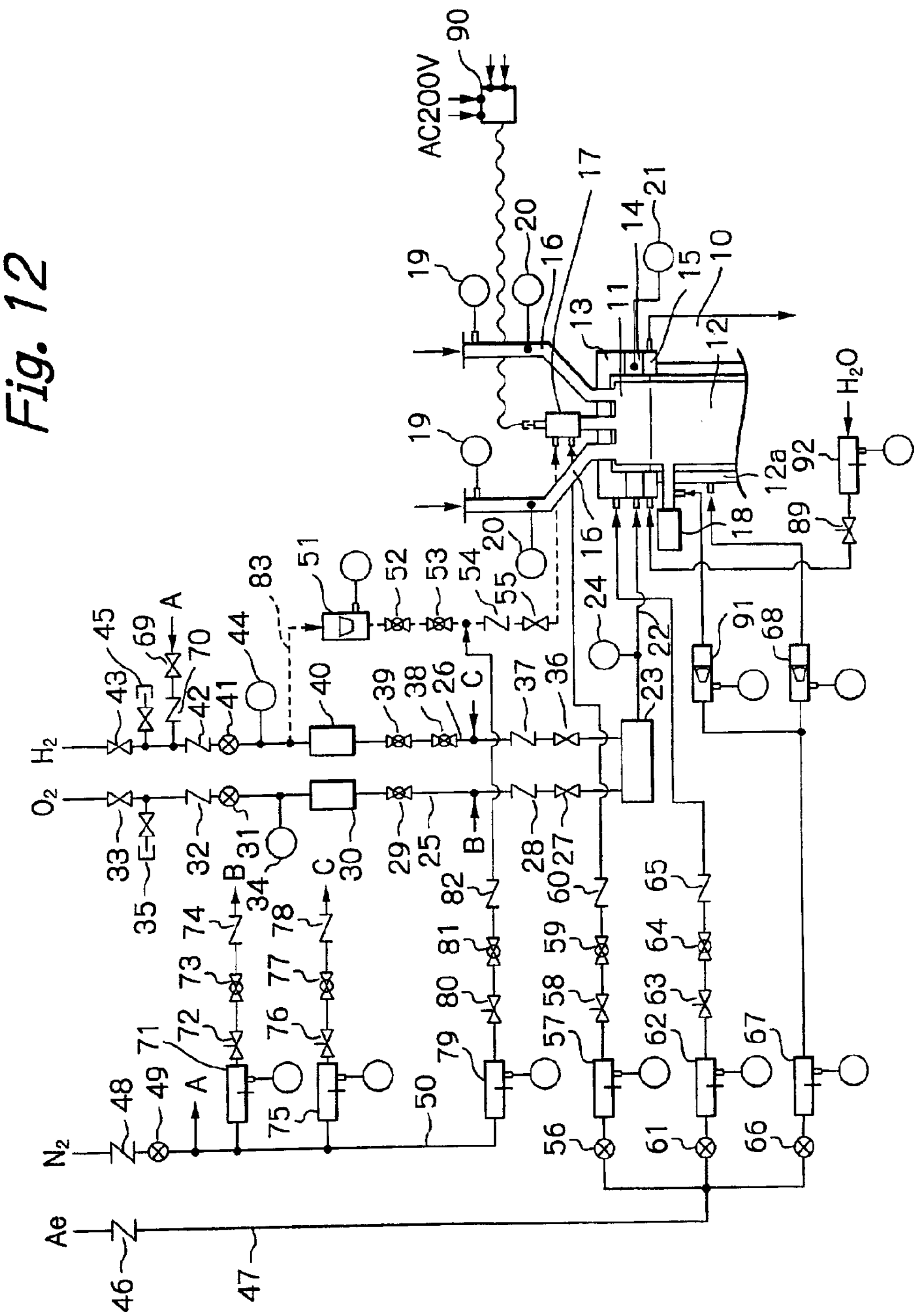
FIG. 12 is a diagram showing a structural example of a third embodiment of the combustion type waste gas treatment system according to the present invention.

A third embodiment of the present invention will be described below with reference to FIGS. 12 to 16. FIG. 12 is a diagram showing a structural example of the combustion type waste gas treatment system according to the present invention. In the figure, arrows A and A, arrows B and B, and arrows C and C are connected together, respectively. In this combustion type waste gas treatment system, hydrogen ($H_2$) gas is used as a gas for combustion. Oxygen ($O_2$) gas is mixed with the hydrogen gas to form combustion flames. Waste gas is introduced into the combustion flames to oxidatively decompose the waste gas. In FIG. 12, a waste gas treatment system body 10 has a burner part 11 and a combustion chamber 12 at the downstream side of the burner part 11.

An air chamber 13 for holding air (Ae) for combustion is provided around the upper part of the outer periphery of the burner part 11. A fuel gas chamber 14 for holding a mixed gas of hydrogen $H_2$ and oxygen $O_2$ is provided around the middle part of the outer periphery of the burner part 11. A cooling water chamber 15 for holding cooling water $H_2O$ is provided around the lower part of the outer periphery of the burner part 11. The top of the burner part 11 is provided with a plurality (four at maximum) of waste gas inlet pipes 16. Each waste gas inlet pipe 16 is provided with a waste gas inlet pressure sensor 19 and a waste gas inlet temperature sensor 20. A pilot burner 17 is provided in the center of the top of the burner part 11. It should be noted that the structure of the waste gas treatment system body 10 is disclosed in detail in the specification and drawings of PCT/JP99/00632 and not related directly to the present invention. Therefore, a description thereof is omitted.

The combustion chamber 12 is provided with a UV sensor 18 for detecting combustion flames. The fuel gas chamber 14 is provided with a fuel gas chamber temperature sensor 21. The fuel gas chamber 14 is connected with a mixer 23 through mixed gas piping 22. The mixed gas piping 22 is provided with a temperature sensor 24 for detecting backfire. The mixer 23 is connected with an oxygen ($O_2$) gas supply line 25 and a hydrogen ($H_2$) gas supply line 26.

The oxygen gas supply line 25 is connected, in order from the downstream side, with a stop valve 27, a check valve 28, a supply valve 29, a mass flow controller 30, a pressure reducing valve 31, a check valve 32 and a stop valve 33. Further, an oxygen pressure sensor 34 for detecting the pressure of oxygen gas is connected between the mass flow controller 30 and the pressure reducing valve 31. A branch valve 35 for injecting a gas for leak check is connected between the check valve 32 and the stop valve 33. The oxygen gas supply line 25 is connected to an oxygen source (not shown).

The hydrogen gas supply line 26 is connected, in order from the downstream side, with a stop valve 36, a check valve 37, a supply valve 38, a supply valve 39, a mass flow controller 40, a pressure reducing valve 41, a check valve 42 and a stop valve 43. Further, a hydrogen pressure sensor 44 for detecting the pressure of hydrogen gas is connected between the mass flow controller 40 and the pressure reducing valve 41. A branch valve 45 for injecting a gas for leak check is connected between the check valve 42 and the stop valve 43. The hydrogen gas supply line 26 is connected to a hydrogen gas source (not shown).

In addition, the combustion type waste gas treatment system is provided with an air supply line 47 connected to an air supply source (not shown) through a check valve 46. Further, a nitrogen gas supply line 50 is connected to a nitrogen ($N_2$) source (not shown) through a pressure reducing valve 49 and a check valve 48.

The pilot burner 17 is supplied with hydrogen gas from a hydrogen gas supply line 83 for pilot burner that branches off from the upstream side of the mass flow controller 40 on the hydrogen gas supply line 26. The hydrogen gas supply line 83 for pilot burner is connected with a flow sensor (area flowmeter) 51, a supply valve 52, a supply valve 53, a check valve 54 and a stop valve 55. The pilot burner 17 can also be supplied with air from the air supply line 47 through a pressure reducing valve 56, a flow sensor (insertion flowmeter) 57, a flow control valve 58, a supply valve 59 and a check valve 60.

The air chamber 13 of the waste gas treatment system body 10 can be supplied with air from the air supply line 47 through a pressure reducing valve 61, a flow sensor (insertion flowmeter) 62, a flow control valve 63, a supply valve 64 and a check valve 65. A thermal insulator packed chamber 12*a* is provided around the outer periphery of the combustion chamber 12 of the waste gas treatment system body 10. The thermal insulator packed chamber 12*a* can be supplied with air for purging from the air supply line 47 through a pressure reducing valve 66, a flow sensor (insertion flowmeter) 67 and a flow sensor (area flowmeter) 68. The UV sensor 18 is also supplied with air for purging. The flow of air for purging can be monitored with a flow sensor (area flowmeter) 91.

Nitrogen gas can be supplied to a point between the check valve 42 and the stop valve 43 on the hydrogen gas supply line 26 from the nitrogen gas supply line 50 through a stop valve 69 and a check valve 70. Nitrogen gas can also be supplied to a point between the check valve 28 and the supply valve 29 on the oxygen gas supply line 25 from the nitrogen gas supply line 50 through a flow sensor (insertion flowmeter) 71, a flow control valve 72, a supply valve 73 and a check valve 74. Further, nitrogen gas can be supplied to a point between the check valve 37 and the supply valve 38 on the hydrogen gas supply line 26 from the nitrogen gas supply line 50 through a flow sensor (insertion flowmeter) 75, a flow control valve 76, a supply valve 77 and a check valve 78.

In addition, nitrogen gas can be supplied to a point between the supply valve 53 and the check valve 54 on the hydrogen gas supply line 83 for pilot burner from the nitrogen gas supply line 50 through a flow sensor (insertion flowmeter) 79, a flow control valve 80, a supply valve 81 and a check valve 82. The cooling water chamber 15 of the waste gas treatment system body 10 is supplied with cold water ($H_2O$) from a cold water source (not shown) through a flow sensor (insertion flowmeter) 92 and a flow control valve 89. The flow of cold water is monitored with the flow sensor 92.

Figure 13:
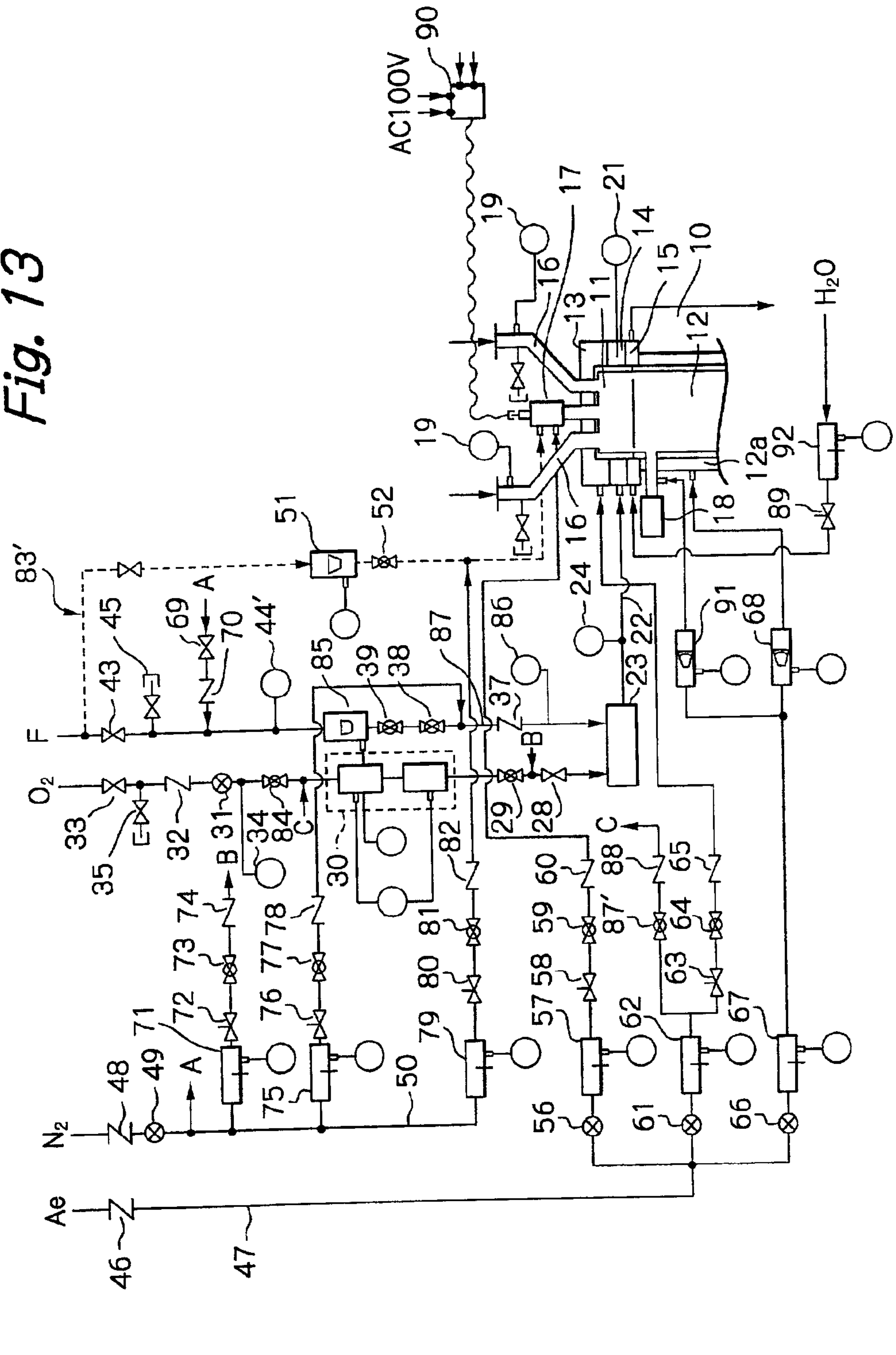
FIG. 13 is a diagram showing another structural example of the third embodiment of the combustion type waste gas treatment system according to the present invention.

FIG. 13 is a diagram showing another structural example of the combustion type waste gas treatment system according to the present invention. This combustion type waste gas treatment system uses a fuel gas supplied at low pressure (lower than about 100 kPa), e.g. city gas or propane gas, as a gas for combustion. In this waste gas treatment system, propane gas is mixed with oxygen gas to form combustion flames. Waste gas is introduced into the combustion flames to oxidatively decompose the waste gas. In FIG. 13, the same reference numerals as those in FIG. 12 denote the same or corresponding portions or members. In FIG. 13, arrows A and A, arrows B and B, and arrows C and C are connected together, respectively.

The combustion type waste gas treatment system shown in FIG. 13 differs substantially from that shown in FIG. 12 in that a propane gas supply line 87 is provided in place of the hydrogen gas supply line 26, and propane gas and oxygen gas are mixed together in the mixer 23. The propane gas supply line 87 is connected, in order from the downstream side, with a check valve 37, a supply valve 38, a supply valve 39, a flow sensor (area flowmeter) 85 and a stop valve 43. In addition, a propane gas supply line 83' for pilot burner 11 is branched off at the upstream side of the stop valve 43 from the propane gas supply line 87.

In the combustion type waste gas treatment systems arranged as stated above, oxygen supplied from the oxygen gas supply line 25 and hydrogen supplied from the hydrogen gas supply line 26 (or propane gas supplied from the propane gas supply line 87) are mixed together in the mixer 23. The mixed gas is supplied through the mixed gas piping 22 to the fuel gas chamber 14 of the waste gas treatment system body 10 and then supplied into the burner part 11 from the fuel gas chamber 14 through fuel gas injection nozzles (not shown). In addition, air for combustion is supplied into the burner part 11 from the air chamber 13 through air injection nozzles (not shown). Meanwhile, hydrogen gas (or propane gas) and air are supplied to the pilot burner 17. When ignited with an igniter 90, the mixed gas of hydrogen (or propane gas) and oxygen burns to form combustion flames extending from the burner part 11 toward the combustion chamber 12. It is preferable to form the combustion flames such that the flames swirl obliquely downward from the burner part 11 toward the center of the combustion chamber 12.

Waste gas containing hazardous and combustible gases, e.g. silane ($SiH_4$) and disilane ($Si_2H_6$), from a semiconductor manufacturing system or a liquid crystal panel manufacturing system is introduced into the combustion flames through the waste gas inlet pipes 16, thereby oxidatively decomposing the waste gas to make it harmless.

In a case where hydrogen gas $H_2$ is used as fuel, and the hydrogen gas and oxygen gas $O_2$ are mixed together in the mixer 23 and supplied to the burner part 11 as shown in FIG. 12, the piping for supplying the hydrogen $H_2$ and $O_2$ oxygen gases is arranged as stated below. By doing so, it is possible to provide a combustion type waste gas treatment system capable of safely and reliably performing ignition and extinction of flames and also capable of sensing an abnormality.

The oxygen gas $O_2$ supply line 25 is connected, in order from the downstream side, with a stop valve 27, a check valve 28, a supply valve 29, a mass flow controller 30, a pressure reducing valve 31, a check valve 32 and a stop valve 33. The hydrogen gas $H_2$ supply line 26 is connected, in order from the downstream side, with a stop valve 36, a check valve 37, a supply valve 38, a supply valve 39, a mass flow controller 40, a pressure reducing valve 41, a check valve 42 and a stop valve 43. With this arrangement, devices having relatively low pressure resistance are disposed on the upstream side, whereas devices exhibiting high pressure resistance or giving rise to no serious problem even if broken are disposed on the downstream side. Accordingly, it is possible to protect the oxygen gas supply line 25 and the hydrogen gas supply line 26 when the pressure rises due to abnormal combustion or the like on the downstream side, where combustion or other similar phenomenon is taking place. The same is true in the combustion type waste gas treatment system shown in FIG. 13, which uses propane gas as fuel.

Further, the volumetric capacity of the mixer 23 for mixing together oxygen gas and hydrogen gas is reduced, and the length of the mixed gas piping 22, which connects the mixer 23 and the burner part 11, is shortened. When backfire occurs, the mixed gas in the mixer 23 and the mixed gas piping 22 as well as the burner part 11 burns in a stroke. However, the combustion energy is minimized by reducing the volumetric capacity of the mixer 23 and shortening the length of the mixed gas piping 22. Accordingly, it is possible to minimize damage to devices due to temperature rise or pressure rise in the piping.

Further, both the oxygen gas supply line 25 and the hydrogen gas supply line 26 are provided with check valves 32 and 42, respectively, on the upstream side of the mixer 23. Thus, it is possible to prevent hydrogen gas from flowing back to the oxygen gas supply line 25 and also prevent oxygen gas from flowing back to the hydrogen gas supply line 26 when there is a pressure rise on the downstream side. Accordingly, it is possible to prevent backfire from spreading into the oxygen gas supply line 25 or the hydrogen gas supply line 26.

When the amount of waste gas flowing in from the waste gas inlet pipes 16 decreases extremely, the burner part 11, which has so far been cooled by the waste gas, heats up, causing the fuel gas chamber 14 to rise in temperature. When the temperature in the fuel gas chamber 14 exceeds the spontaneous ignition point of the fuel gas (i.e. the mixed gas of hydrogen and oxygen), backfire occurs. Therefore, the temperature in the fuel gas chamber 14 is monitored with the fuel gas chamber temperature sensor 21. When the temperature in the fuel gas chamber 14 reaches a predetermined temperature below a temperature at which spontaneous ignition may occur, the flames are extinguished automatically to prevent the occurrence of backfire.

Figure 14:
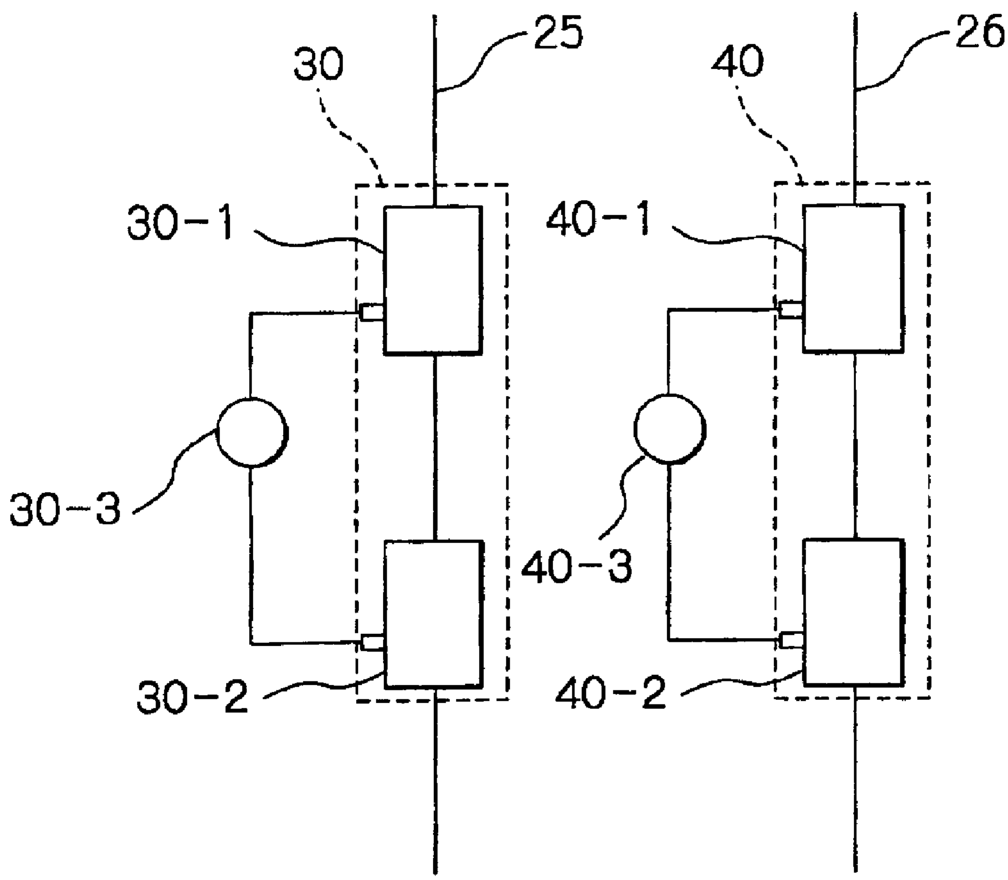
FIG. 14 is a diagram showing a structural example of mass flow controllers used in the third embodiment of the combustion type waste gas treatment system according to the present invention.

In a case where the mass flow controllers 30 and 40 are each used in place of a combination of a flowmeter and a flow control valve, as shown in FIG. 14, the mass flow controller 30 is formed from a combination of a mass flowmeter 30-1 and a mass flow controller 30-2, and the mass flow controller 40 is formed from a combination of a mass flowmeter 40-1 and a mass flow controller 40-2. It should be note that reference numerals 30-3 and 40-3 denote flow indicators, respectively. With these combinations, the flow indicators 30-3 and 40-3 indicate values detected with the mass flowmeters 30-1 and 40-1. Flow control is effected with values set individually on the mass flow controllers 30-2 and 40-2. Thus, when there is a failure of either the flow detecting function of the mass flowmeter 30-1 or 40-1 or the flow control function of the mass flow controller 30-2 or 40-2, the failure can be detected as an abnormality of the indicated value.

The oxygen gas supply line 25 is provided with an oxygen pressure sensor 34 for detecting the oxygen gas pressure, and the hydrogen gas supply line 26 (or the propane gas supply line 87) is provided with a hydrogen pressure sensor 44 for detecting the hydrogen gas pressure (or a propane gas pressure sensor 44' for detecting the propane gas pressure), thereby making it possible to monitor the oxygen gas pressure and the hydrogen gas pressure (or the propane gas pressure). Thus, it is possible to detect a change in the supply pressure, which is the principal cause of a change in the oxygen gas flow rate and the hydrogen gas flow rate (or the propane gas flow rate). Consequently, an abnormality can be detected before the occurrence of a change in the flow rate, which may cause backfire or blow-off of flames.

The oxygen gas supply line 25 is provided with a stop valve 27 between the downstream-most check valve 28 and the mixer 23. Similarly, the hydrogen gas supply line 26 is provided with a stop valve 36 between the downstream-most check valve 37 and the mixer 23. In addition, a stop valve 33 is provided on the upstream side of the upstream-most check valve 32, and a stop valve 43 is provided on the upstream side of the upstream-most check valve 42. In addition, a branch valve 35 is provided between the stop valve 33 and the check valve 32, and a branch valve 45 is provided between the stop valve 43 and the check valve 42. Therefore, an airtightness test can readily be carried out by injecting a gas for leak check (e.g. helium gas or nitrogen gas) through the branch valves 35 and 45 with the downstream-most stop valves 27 and 36 and the upstream-most stop valves 33 and 43 closed. The ease of carrying out an airtightness test is particularly effective in a case where hydrogen gas, which is likely to leak, is used as fuel.

The hydrogen gas supply line 26 is provided with double supply valves 38 and 39. Similarly, the hydrogen gas supply line 83 for pilot burner 17 is provided with double supply valves 52 and 53. Thus, even if one of the pair of hydrogen gas supply valves becomes incapable of surely cutting off the supply of hydrogen gas owing to a failure, e.g. clogging with dust or other foreign matter, the other supply valve can serve as a back-up to cut off the supply of hydrogen gas.

Figure 15:
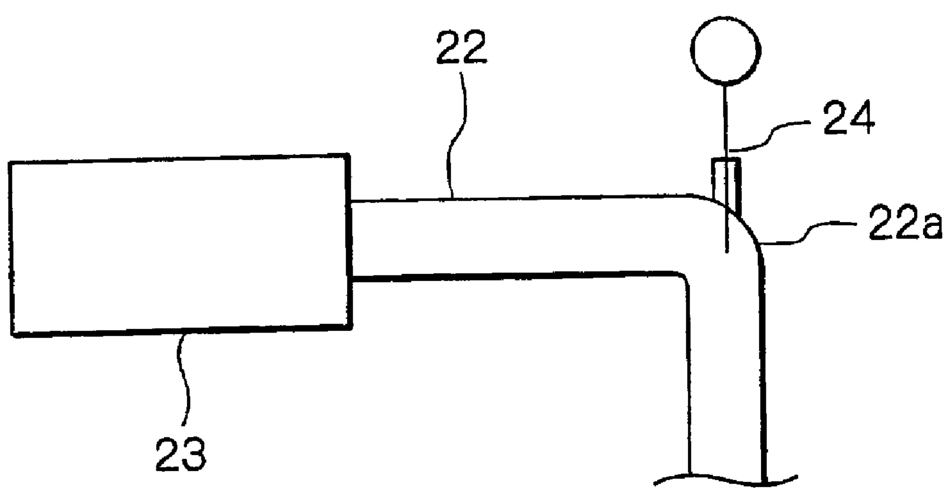
FIG. 15 is a diagram showing the neighborhood of a mixer used in the third embodiment of the combustion type waste gas treatment system according to the present invention.

The diameter of the mixed gas piping 22 is set so that the flow velocity of the mixed gas flowing through the mixed gas piping 22 after the mixer 23 will be lower than the burning velocity. In addition, as shown in FIG. 15, the mixed gas piping 22 is provided with a bent portion **22*a* immediately downstream of the outlet of the mixer 23, and a temperature sensor 24 for detecting backfire is provided on the bent portion 22*a* to monitor the temperature. With these arrangements, when backfire occurs, the flow of the mixed gas stagnates at the bent portion 22*a***, and flames are surely formed. Therefore, backfire can be detected reliably.

Figure 16:
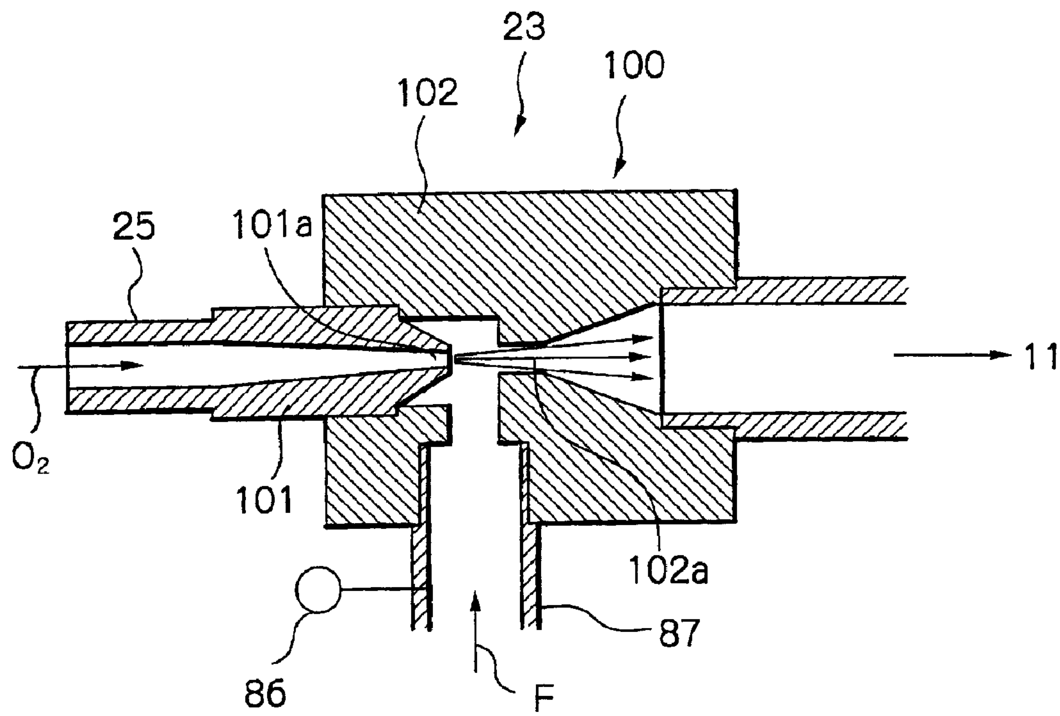
FIG. 16 is a diagram showing a structural example of the mixer used in the third embodiment of the combustion type waste gas treatment system according to the present invention.

When propane gas F is used under low supply pressure (of the order of 2 kPa) in the combustion type waste gas treatment system shown in FIG. 13, in particular, an ejector 100 as shown in FIG. 16 may be used as a mixer for mixing together propane gas F as fuel and oxygen gas $O_2$. The ejector 100 uses oxygen gas $O_2$ as the driving force and allows the suction port pressure to be −15 kPa or lower. Thus, even if the propane gas supply pressure is low and varies within 1.5 kPa or there are pressure variations in the burner part 11, the actual fuel flow variations can be held within 5%.

When an ejector arranged as shown in FIG. 16 is used as the mixer 23, a suction pressure sensor 86 for the ejector is provided to monitor the suction port pressure. When the suction port pressure reaches at least −15 kPa, it is judged that there is an abnormality, and the supply of fuel gas and oxygen gas flowing into the mixer 23 is cut off. A rise in the suction pressure of the ejector is caused by a reduction in the flow rate of oxygen gas, clogging of the fuel piping, or an abnormal pressure rise in the burner part 11. Therefore, abnormal combustion and the backflow of oxygen toward the propane gas supply line can be prevented by cutting off the supply of fuel gas and oxygen gas upon detecting a rise in the ejector suction pressure as stated above.

Further, when an ejector arranged as shown in FIG. 16 is used as the mixer 23, the ejector may have a structure splittable into a nozzle part 101 supplied with oxygen gas as a driving gas and a diffuser part 102 in which a suction pressure is actually produced. This ejector structure makes it possible to readily change the combination of the diameter of a nozzle **101*a* in the nozzle part 101 and the diameter of a diffuser 102***a* in the diffuser part 102. Thus, when the flow rate of propane gas as fuel and the flow rate of oxygen gas are to be changed, an ejector having the necessary performance can be selected easily.

Further, as stated above, a purge line is provided to allow nitrogen gas to be supplied to the oxygen gas supply line 25 from the nitrogen gas supply line 50 through the flow sensor 71, the flow control valve 72, the supply valve 73 and the check valve 74, and another purge line is provided to allow nitrogen gas to be supplied to the hydrogen gas supply line 26 at a point between the check valve 37 and the supply valve 38 from the nitrogen gas supply line 50 through the flow sensor 75, the flow control valve 76, the supply valve 77 and the check valve 78. The nitrogen gas injection points of the oxygen gas supply line 25 and the hydrogen gas supply line 26 are set on the downstream sides of the supply valves 29 and 38, respectively. Therefore, at the time of extinction of flames, the fuel gas (oxygen gas or propane gas) can be replaced with the same amount of nitrogen gas. Accordingly, there is no change in flow rate, and thus the occurrence of backfire can be prevented when the flames are extinguished.

In a combustion type waste gas treatment system wherein oxygen gas and fuel gas (hydrogen gas or propane gas) are mixed together in the mixer 23 and supplied to the burner part 11 where the mixed gas is ignited as stated above, particularly in a combustion type waste gas treatment system that uses propane gas as fuel as shown in FIG. 13, when the supply pressure of propane gas is low (of the order of 2 kPa) or a fuel having a low burning velocity (i.e. the burning velocity in the air is 1 m/s or less) is used, the fuel gas can be ignited and burned safely and reliably by igniting the burner part 11 according to the following procedure.

At the beginning of ignition, not oxygen but air is supplied to the ejector (see FIG. 16) serving as the mixer 23 from the air supply line 47 by opening the supply valves 29 and 87' for supplying air for ignition. After the required suction pressure has been ensured, the supply valves 38 and 39 are opened to begin to supply fuel gas (propane gas). Then, the supply valve 87' is closed, and a supply valve 84 is opened to change the gas to be supplied from the ignition air to oxygen. By doing so, the ratio of the amount of oxygen gas to the amount of fuel gas becomes temporarily high. Accordingly, it is possible to prevent the occurrence of backfire due to a rise in the burning velocity.

At the time of igniting the burner part 11 serving as the main burner with the pilot burner 17, after the burner part 11 has been ignited, the supply valve 64 is opened to allow swirling air to flow in from the air supply line 47. If a fuel exhibiting a low flame propagation velocity is used, the supply valve 64 is opened and closed to repeat the supply and cutoff one or more times at intervals of one second at the beginning of the supply of swirling air. Thus, even if there is an unignited fuel injection nozzle after the ignition of the burner part 11 as the main burner, the direction of flames from ignited fuel injection nozzles is changed by the strong swirling flows of air, so that flames can surely be formed from all the fuel injection nozzles.

As has been stated above, the present invention provides the following advantageous effects.

According to the present invention, each waste gas inlet pipe is provided with a flow velocity accelerating device, e.g. an orifice or a narrowed pipe portion, which makes the flow velocity of the combustible waste gas flowing through the waste gas inlet pipe higher than the burning velocity of the combustible waste gas. Accordingly, it is possible to prevent backfire from spreading into the waste gas inlet pipe.

According to the present invention, the flow velocity accelerating device is provided in a coupling mechanism for coupling together a flange at an inlet of the waste gas inlet pipe and a flange at an end of a waste gas supply pipe, and a plate-shaped member with an orifice opening formed in the center thereof is interposed between the two flanges. Accordingly, it is possible to prevent backfire from spreading into the waste gas inlet pipe without changing the structure of the existing combustion type waste gas treatment system.

According to the present invention, the radial position of an opening of the waste gas inlet pipe that opens on the inner wall surface of the burner part is set in the free vortex area. Consequently, the waste gas flowing into the burner part is thoroughly mixed with the combustion gas of the auxiliary burning gas, which promotes thermal oxidative decomposition of the waste gas.

According to the present invention, the waste gas inlet pipe is arranged so that the waste gas blown off from the opening of the waste gas inlet pipe that opens on the inner wall surface of the burner part forms a swirling flow directed obliquely downward in the burner part and the combustion chamber. Therefore, the length of time (resident time) that the waste gas stays in the combustion chamber increases. Consequently, heating of the waste gas is facilitated, and mixing of the waste gas with other combustion gas is promoted. Accordingly, thermal oxidative decomposition of the waste gas can be carried out efficiently.

According to the present invention, a mixer is provided outside the burner part and supplied with oxygen gas from an oxygen gas supply line and a fuel gas from a fuel gas supply line to mix together the two gases, and the mixed gas is supplied to the burner part. Therefore, it is easy to control the mixture ratio of the oxygen gas and the fuel gas in the mixer. Accordingly, it becomes possible to realize efficient combustion treatment of waste gas and easy to prevent the occurrence of abnormal ignition and backfire at the time of ignition and extinction of flames.

According to the present invention, a plurality of devices inserted and connected to each of the oxygen gas supply line and the fuel gas supply line are arranged so that those which have relatively low pressure resistance are disposed on the upstream side and those which exhibit high pressure resistance or give rise to no problem even if broken are disposed on the downstream side. Therefore, it is possible to protect the oxygen gas supply line and the fuel gas supply line when the pressure rises due to abnormal combustion or the like on the downstream side, where combustion or other similar phenomenon is taking place.

According to the present invention, check valves are provided in both the oxygen gas supply line and the fuel gas supply line. Therefore, it is possible to prevent the fuel gas from flowing back to the oxygen gas supply line from the fuel gas supply line and also prevent oxygen gas from flowing back to the fuel gas supply line from the oxygen gas supply line when there is a pressure rise on the downstream side. Accordingly, it is possible to prevent backfire from spreading into these supply lines.

Further, a branch valve for injecting a gas for leak check is provided between the first stop valve and the second stop valve. Accordingly, leak check can be performed extremely easily. The ease of carrying out leak check is particularly effective in a case where hydrogen gas, which is likely to leak, is used as fuel.

According to the present invention, a temperature sensor for detecting the temperature in the fuel gas chamber is provided, and when the temperature in the fuel gas chamber reaches a predetermined temperature below the spontaneous ignition point of the mixed gas, the flames in the burner part are automatically extinguished. Accordingly, no backfire will occur.

According to the present invention, at the time of extinguishing the flames, the oxygen gas supply valve and the fuel gas supply valve are closed to stop the supply of the oxygen gas and the fuel gas. Thereafter, the oxygen gas supply line and the fuel gas supply line are supplied with a non-combustible gas as a purge gas in an amount equal to the amount of oxygen gas and fuel gas which would otherwise be supplied. Consequently, it is possible to eliminate variations in the flow rate. Thus, it becomes possible to prevent the occurrence of backfire at the time of extinction of flames.

It should be noted that the present invention is not limited to the foregoing embodiments but can be modified in a variety of ways.

What is claimed is:

1. A combustion-type waste gas treatment system comprising:

a burner;

a combustion chamber downstream of said burner, said burner and said combustion chamber being shaped and arranged so that combustion flames formed in said burner extend toward said combustion chamber;

a waste gas supply line for introducing a waste gas into the combustion flames so as to oxidatively decompose the waste gas;

an oxygen gas supply line for supplying oxygen gas;

a fuel gas supply line for supplying fuel gas;

a mixer outside said burner, said mixer being connected to said oxygen gas supply line to receive oxygen gas therethrough, being connected to said fuel gas supply line to receive fuel gas therethrough, and being shaped and arranged to mix together the oxygen gas and the fuel gas to thereby form a mixed gas;

a mixed gas supply line connecting said mixer to said burner so as to supply the mixed gas formed in said mixer to said burner;

a first stop valve in a downstream section of each of said oxygen gas supply line and said fuel gas supply line;

a first check valve in a downstream section of each of said oxygen gas supply line and said fuel gas supply line, and located upstream of said first stop valve in each of said oxygen gas supply line and said fuel gas supply line;

a second check valve in an upstream section of each of said oxygen gas supply line and said fuel gas supply line;

a second stop valve in an upstream section of each of said oxygen gas supply line and said fuel gas supply line, and located upstream of said second check valve in each of said oxygen gas supply line and said fuel gas supply line; and a branch valve for injecting a gas for leak checking each of said oxygen gas supply line and said fuel gas supply line, located between said first stop valve and said second stop valve in each of said oxygen gas supply line and said fuel gas supply line.

2. The system of claim 1, further comprising:

a fuel gas chamber around an outer periphery of said burner, said fuel gas chamber being connected to said mixed gas supply line so as to receive the mixed gas from said mixer;

a nozzle for injecting the mixed gas into said burner from said fuel gas chamber;

a temperature sensor for detecting a temperature in said fuel gas chamber; and an extinguishing mechanism operable to automatically extinguish the combustion flames in said burner when the detected temperature in said fuel gas chamber reaches a predetermined temperature below a spontaneous ignition temperature of the mixed gas.

3. The system of claim 1, further comprising:

an oxygen gas supply valve in said oxygen gas supply line;

a fuel gas supply valve in said fuel gas supply line;

a non-combustible gas supply line for supplying non-combustible gas; and a purge line arranged to inject the non-combustible gas from said non-combustible gas supply line into said oxygen gas supply line downstream of said oxygen gas supply valve, and into said fuel gas supply line downstream of said fuel gas supply valve;

wherein said oxygen gas supply valve, said fuel gas supply valve, and said purge line are arranged and operable such that, when the combustion flames in said burner are extinguished, said oxygen gas supply valve and said fuel gas supply valve are closed, and said purge line injects the non-combustible gas from said non-combustible gas supply line into said oxygen gas supply line and fuel gas supply line in an amount equal to an amount of the oxygen gas and the fuel gas which would otherwise be supplied therethrough.

* * * * *